United States Patent
Ashikari et al.

(10) Patent No.: US 11,446,638 B2
(45) Date of Patent: Sep. 20, 2022

(54) HYDROGEN-PRODUCING CATALYST AND EXHAUST GAS PURIFYING CATALYST USING SAME

(71) Applicant: UMICORE SHOKUBAI JAPAN CO., LTD., Aichi (JP)

(72) Inventors: Kenji Ashikari, Aichi (JP); Yuji Ogino, Aichi (JP); Yusuke Haneda, Aichi (JP)

(73) Assignee: UMICORE SHOKUBAI JAPAN CO., LTD, Aichi (JP)

( * ) Notice: Subject to any disclaimer, the term of this patent is extended or adjusted under 35 U.S.C. 154(b) by 191 days.

(21) Appl. No.: 16/772,856

(22) PCT Filed: Dec. 13, 2018

(86) PCT No.: PCT/JP2018/045901
§ 371 (c)(1),
(2) Date: Jun. 15, 2020

(87) PCT Pub. No.: WO2019/131176
PCT Pub. Date: Jul. 4, 2019

(65) Prior Publication Data
US 2020/0330964 A1  Oct. 22, 2020

(30) Foreign Application Priority Data
Dec. 28, 2017 (JP) .............................. JP2017-254105

(51) Int. Cl.
*B01J 21/04* (2006.01)
*B01J 21/06* (2006.01)
(Continued)

(52) U.S. Cl.
CPC .......... *B01J 23/63* (2013.01); *B01J 35/0006* (2013.01); *B01J 35/006* (2013.01); *C01B 3/16* (2013.01);
(Continued)

(58) Field of Classification Search
CPC . B01J 21/04; B01J 21/066; B01J 23/10; B01J 23/63; B01J 35/0006; B01J 35/006; C01B 3/16; F01N 3/101; F01N 3/2803
(Continued)

(56) References Cited

U.S. PATENT DOCUMENTS 5,693,299 A * 12/1997 Chopin .................... B01J 23/10
                                                       423/247
6,150,288 A * 11/2000 Suzuki ................. B01J 37/0236
                                                       502/313
(Continued)

FOREIGN PATENT DOCUMENTS

EP        1 172 139 A1   1/2002
JP        2002-079097 A  3/2002
(Continued)

OTHER PUBLICATIONS

Indian Examination Report dated Sep. 30, 2021 for Indian Patent Application No. 202148019852 (6 pages).
(Continued)

*Primary Examiner* — Cam N. Nguyen
(74) *Attorney, Agent, or Firm* — Smith, Gambrell & Russell, LLP

(57) ABSTRACT

An object of the present invention is to provide means for improving the hydrogen generation properties of a hydrogen-producing catalyst. A hydrogen-producing catalyst according to one aspect of the present invention comprises Rh and a composite containing Al, Ce, and Zr. When a ratio of the number of Al atoms to the number of Ce atoms (Al/Ce) in the composite measured by X-ray fluorescence (XRF) analysis is $R_1$ and a ratio of the number of Al atoms to the number of Ce atoms (Al/Ce) in the composite mea-
(Continued)

sured by an X-ray photoelectron spectroscopy (XPS) method is $R_2$, a value of $R_2/R_1$ is greater than 2.25 and less than 5.92.

20 Claims, 3 Drawing Sheets

(51) Int. Cl.
| | | |
|---|---|---|
| B01J 23/10 | (2006.01) | |
| B01J 23/63 | (2006.01) | |
| B01J 35/00 | (2006.01) | |
| C01B 3/16 | (2006.01) | |
| F01N 3/10 | (2006.01) | |
| F01N 3/28 | (2006.01) | |

(52) U.S. Cl.
CPC ............ *F01N 3/101* (2013.01); *F01N 3/2803* (2013.01); *C01B 2203/1064* (2013.01); *F01N 2370/02* (2013.01); *F01N 2510/0684* (2013.01)

(58) Field of Classification Search
USPC ........ 502/304, 327, 332, 349, 355, 415, 439
See application file for complete search history.

(56) References Cited

U.S. PATENT DOCUMENTS

| | | | | |
|---|---|---|---|---|
| 6,335,305 | B1* | 1/2002 | Suzuki | B01D 53/945 |
| | | | | 502/328 |
| 6,468,941 | B1* | 10/2002 | Bortun | B01J 23/6484 |
| | | | | 502/340 |
| 7,247,597 | B2* | 7/2007 | Morikawa | B01J 23/63 |
| | | | | 423/594.12 |
| 7,566,424 | B2* | 7/2009 | Miyoshi | B01J 23/63 |
| | | | | 422/180 |
| 7,608,561 | B2* | 10/2009 | Miyoshi | B01J 23/63 |
| | | | | 502/332 |
| 8,465,711 | B2* | 6/2013 | Ikeda | B01J 21/04 |
| | | | | 502/355 |
| 9,254,475 | B2* | 2/2016 | Saito | B01J 37/031 |
| 9,409,152 | B2* | 8/2016 | Kumatani | B01J 35/023 |
| 9,475,035 | B2* | 10/2016 | Schermanz | B01J 35/1019 |
| 9,561,494 | B2* | 2/2017 | Kato | B01J 23/466 |
| 9,889,428 | B2* | 2/2018 | Schermanz | B01J 37/04 |
| 10,618,034 | B2* | 4/2020 | Kasuya | F01N 3/2803 |
| 10,625,243 | B2* | 4/2020 | Clowes | B01J 35/04 |
| 10,766,018 | B2* | 9/2020 | Schoneborn | B01J 37/033 |
| 11,135,569 | B2* | 10/2021 | Schermanz | B01J 37/033 |
| 2006/0172885 | A1 | 8/2006 | Shirnazu et al. | |
| 2007/0179053 | A1 | 8/2007 | Lee et al. | |
| 2014/0072493 | A1 | 3/2014 | Kato et al. | |
| 2015/0367328 | A1 | 12/2015 | Ikeda et al. | |
| 2016/0279620 | A1 | 9/2016 | Miura et al. | |
| 2019/0039049 | A1* | 2/2019 | Itoh | F01N 3/10 |

FOREIGN PATENT DOCUMENTS

| | | |
|---|---|---|
| JP | 2006-232656 A | 9/2006 |
| JP | 2007-196146 A | 8/2007 |
| JP | 2007-204363 A | 8/2007 |
| JP | 2010-207782 A | 9/2010 |
| JP | 2012-061399 A | 3/2012 |
| JP | 2015-093266 A | 5/2015 |
| JP | 2018-150207 A | 9/2018 |

OTHER PUBLICATIONS

International Search Report for PCT/JP2018/045901, dated Feb. 5, 2019 (7 pgs. with English translation).
Written Opinion of the International Searching Authority PCT/JP2018/045901, dated Feb. 5, 2019 (4 pgs.).
Indian Examination Report dated Feb. 2, 2021 for Indian Patent Application No. 202047026707 (6 Pages).
Supplementary European Search Report dated Sep. 7, 2021 for European Patent Application No. 18896815.0 (6 Pages).

* cited by examiner

US 11,446,638 B2

HYDROGEN-PRODUCING CATALYST AND EXHAUST GAS PURIFYING CATALYST USING SAME

TECHNICAL FIELD

The present invention relates to a hydrogen-producing catalyst and an exhaust gas purifying catalyst using the same.

PRIOR ART

In recent years, regulations on automobile exhaust gas have been tightened. To comply with the tightened regulations, the demand for further improvement in exhaust gas purification performance in exhaust gas purifying catalysts has become even stronger. In particular, since it is difficult to implement reduction in nitrogen oxide (NOx) simultaneously with oxidation of carbon monoxide (CO) and hydrocarbons (HC), technologies for improving NOx purification performance have been actively developed.

Methods of purifying NOx include a method of direct decomposition from NOx to nitrogen ($N_2$) and a method of reacting NOx with a reducing agent to accomplish the reduction to $N_2$. However, since the former method is extremely difficult to implement, the latter method using a reducing agent is widely used today.

In the related art, as methods of purifying NOx by using a reducing agent, various methods have been reported, including a method, in which urea water is introduced into an exhaust gas pipe from a mounted tank and generated ammonia ($NH_3$) is used as a reducing agent, and a method, in which hydrocarbons in fuel are used as a reducing agent. On the other hand, the number of reports on methods of using hydrogen as a reducing agent is low due to a reason that, although hydrogen ($H_2$) has highly reductive properties, there is a difficulty of, for instance, supplying sufficient hydrogen.

For all this, however, several technologies have been reported, in which a Water Gas Shift reaction (also referred to as a WGS reaction) between carbon monoxide (CO) contained in the exhaust gas of an internal combustion engine and water vapor ($H_2O$) contained in this exhaust gas was performed to generate hydrogen and the hydrogen was used to accomplish the reduction reaction of NOx. Since these techniques generate hydrogen in a catalyst, the reduction of NOx can be enhanced.

JP 2007-196146 A discloses an exhaust gas purifying catalyst in which a second catalyst layer having a function of producing hydrogen is disposed on a first catalyst layer having a function of capturing nitrogen oxide and an inorganic material layer is disposed between the first catalyst layer and the second catalyst layer. According to JP 2007-196146 A, with the inorganic material layer being provided, an alkali component contained in the first catalyst layer is prevented from dissolving into a washcoat slurry when the second catalyst layer is formed with washcoat and a decrease in water gas shift reaction efficiency in the second catalyst layer is suppressed. Note that, in JP 2007-196146 A, a hydrogen-producing catalyst that contains cerium oxide as a main component and supports a co-catalyst component, such as Ti, Zr, Pr, and Nd, and, in which a noble metal is supported thereon, is used.

SUMMARY OF THE INVENTION

Problem to be Solved by the Invention

However, the hydrogen-producing catalyst disclosed in JP 2007-196146 A does not have desired hydrogen generation properties, and further improvement thereof has been desired.

Therefore, an object of the present invention is to provide means for improving the hydrogen generation properties of a hydrogen-producing catalyst.

Means for Solving the Problem

A hydrogen-producing catalyst according to one aspect of the present invention contains a composite containing Al, Ce, and Zr and Rh. When the ratio of the number of Al atoms to the number of Ce atoms (Al/Ce) in the composite measured by X-ray fluorescence (XRF) analysis is $R_1$ and the ratio of the number of Al atoms to the number of Ce atoms (Al/Ce) in the composite measured by an X-ray photoelectron spectroscopy (XPS) method is $R_2$, the value of $R_2/R_1$ is greater than 2.25 and less than 5.92.

BEST MODE FOR CARRYING OUT THE INVENTION

Figure 1:
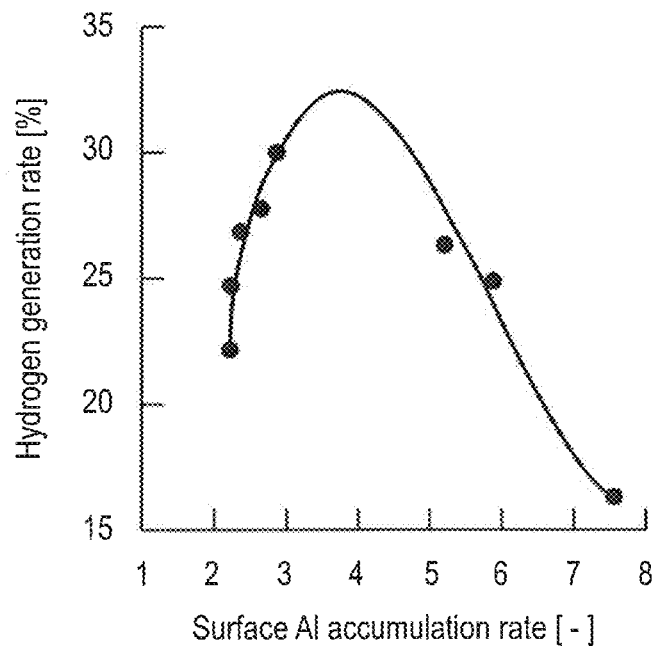
FIG. 1 is a graph expressing and illustrating the relationship between surface Al accumulation rates ($R_2/R_1$) and hydrogen generation rates in catalysts A to H.

While embodiments of the present invention are described below, the technical scope of the present invention should be defined based on the description of the claims and is not limited to the following embodiments. Note that a numerical range "A to B" in the present specification includes A and B and means "A or more and B or less." Also, "A and/or B" means "either one of A and B" or "both A and B."

Hydrogen-Producing Catalyst

One aspect of the present invention is the hydrogen-producing catalyst that contains a composite containing Al, Ce, and Zr (hereinafter, also simply referred to as "Al—Ce—Zr composite" or "composite") and Rh. When the ratio of the number of Al atoms to the number of Ce atoms (Al/Ce) in the composite measured by X-ray fluorescence (XRF) analysis is denoted as $R_1$ and the ratio of the number of Al atoms to the number of Ce atoms (Al/Ce) in the composite measured by X-ray photoelectron spectroscopy (XPS) method is denoted as $R_2$, the value of $R_2/R_1$ is greater than 2.25 and less than 5.92. According to this aspect, improving the hydrogen generation properties of the hydrogen-producing catalyst is possible.

The present inventors conducted diligent research into the problems to be solved by the present invention described above. As a result, it was found that, by using the composite containing Al, Ce, and Zr, and Rh as catalyst components and by increasing the accumulation of Al relative to Ce in a certain range on the surface of the composite particles, hydrogen generation properties are improved significantly, whereby the present invention is completed. Here, the accumulation refers to a state in which the distribution of Al in the composite is not uniform, but a large number of Al are present (accumulated) near the surface of the composite particles. The degree of accumulation is expressed by the surface Al accumulation rate ($R_2/R_1$) described later.

Although the reason why the hydrogen-producing catalyst according to the present invention having the structure above improves the hydrogen generation properties is unclear, the present inventors infer as follows. Note that the present invention is not limited to the following mechanism.

A water gas shift reaction is represented by a reaction formula: $CO+H_2O \rightarrow CO_2+H_2$ and generates carbon dioxide ($CO_2$) and hydrogen ($H_2$) from carbon monoxide (CO) and water ($H_2O$). As also described in JP 2007-196146 A, Ce has been conventionally used as a material effective for the water gas shift reaction. However, since Ce has an oxygen storage capacity, Ce stores oxygen under an atmosphere in which oxygen is present. It is considered that the surface of Rh where the water gas shift reaction is catalyzed is oxidized from $Rh^0$ to $Rh^{3+}$ by the stored oxygen. While a property $Rh^0$ is to adsorb oxygen atom (O)-containing gas, such as CO, the oxidized $Rh^{3+}$ is less likely to adsorb or does not adsorb the oxygen atom-containing gas. Thus, when $Rh^{3+}$ predominates on the Rh surface, CO, which is a reactant of the water gas shift reaction, cannot be sufficiently adsorbed onto the Rh surface, and as a result, the hydrogen generation properties may be reduced.

The composite contained in the hydrogen-producing catalyst according to the present invention contains Al, Ce, and Zr, wherein the ratio $R_1$ of the number of Al atoms to the number of Ce atoms (Al/Ce) in the entire composite measured by XRF is within a predetermined range relative to the ratio $R_2$ of the number of Al atoms to the number of Ce atoms (Al/Ce (atom ratio)) near (several nm) the surface of the composite measured by XPS. That is, this features that Al is present in the entire composite and Al is accumulated near the surface. It is considered that, by the presence of accumulated Al near the surface of the composite (with the Ce concentration near the surface being relatively lowered), $Rh^0$, which is reductive, is predominantly present on the Rh surface. It is considered that the adsorption of CO on $Rh^0$ sufficiently supplies CO to the Rh surface, and this results in improved hydrogen generation properties.

Each structure for the hydrogen-producing catalyst is described in detail below.

Al—Ce—Zr Composite

The composite containing Al, Ce, and Zr is indispensable in the hydrogen-producing catalyst. In the present specification, the "composite containing Al, Ce, and Zr" means a composite containing metal(s) and/or metal oxide(s) of Al, Ce, and Zr.

In the composite contained in the hydrogen-producing catalyst according to the present invention, when the ratio of the number of Al atoms to the number of Ce atoms (Al/Ce) measured by X-ray fluorescence (XRF) analysis is denoted as $R_1$ and the ratio of the number of Al atoms to the number of Ce atoms Al/Ce) in the composite measured by X-ray photoelectron spectroscopy (XPS) method is denoted as $R_2$, the value of $R_2/R_1$ is greater than 2.25 and less than 5.92. $R_1$ measured by XRF indicates the ratio of the number of Al atoms to the number of Ce atoms contained in the entire composite particles. On the other hand, $R_2$ measured by XPS indicates the ratio of the number of Al atoms to the number of Ce atoms contained several nm deep from the surfaces of the composite particles. Here, the term several nm means preferably 10 nm, more preferably 8 nm, and further preferably 5 nm. Thus, $R_2/R_1$ means the ratio of the Al concentration near the surfaces of the composite particles to the Al concentration in the entire composite particles. The larger $R_2/R_1$ suggests that Al is accumulated near the surfaces of the composite particles. Note that, in the present specification, the value of $R_2/R_1$ is also referred to as a "surface Al accumulation rate." $R_1$ and $R_2$ are calculated from the values measured by the XRF analysis and the XPS method, respectively, as disclosed in examples described later. Note that, in the examples described later, the XRF analysis was performed in accordance with JIS K0119: 2008. Samples for analysis were produced in accordance with 6.2 Preparation of Samples for Quantitative Analysis. As the quantitative method, 10. Quantitative Analysis and 10.1(d) Fundamental Parameter Method were used. The XPS analysis was performed in accordance with JIS K0167: 2011.

The lower limit of the surface Al accumulation rate ($R_2/R_1$) is greater than 2.25, preferably 2.40 or greater, more preferably 2.62 or greater, and further preferably 2.84 or greater. At or below the lower limit of 2.25 sufficient hydrogen generation properties may not be exhibited. It is inferred that this is because Al is not sufficiently accumulated near the surface of the composite, and therefore the Rh surface is less likely to be reductive (the Rh surface is likely to be oxidized) and CO is not sufficiently adsorbed onto the Rh surface. On the other hand, the upper limit of the surface Al accumulation rate ($R_2/R_1$) is less than 5.92, preferably 5.23 or less, more preferably 5.00 or less, and particularly preferably 4.80 or less. At or above the upper limit of 5.92, sufficient hydrogen generation properties may not be exhibited. It is inferred that this is because the relative Ce concentration contributing to the water gas shift reaction near the surface of the composite decreases, and therefore the water gas shift reaction is less likely to progress. The numerical range of the surface Al accumulation rate ($R_2/R_1$) is indispensably greater than 2.25 and less than 5.92, preferably from 2.40 to 5.23, more preferably from 2.62 to 5.00, and further preferably from 2.84 to 4.80. The values within the numerical range may allow sufficient hydrogen generation properties to be exhibited.

The ratio of the number of Al atoms in the composite to the number of atoms of the metal elements contained in the composite is preferably 50% to 92%, more preferably 70% to 91%, and further preferably 75% to 90%. When the content of the Al atoms is 50% or greater, $Rh^0$ contributing to the hydrogen generation reaction is likely to be generated, which is preferable. On the other hand, when the ratio of the number of Al atoms is 92% or less, CO is likely to contact $CeO_2$ in the composite, which is preferable.

The ratio of the number of Ce atoms in the composite to the number of atoms of the metal elements contained in the composite is preferably from 3% to 20%, more preferably from 4% to 18%, and further preferably from 4.8% to 17%. When the content of Ce atoms is 3% or more, the water gas shift reaction is likely to occur, which is preferable. On the other hand, when the ratio of the number of Ce atoms is 20% or less, the generation of $Rh^{3+}$ is likely to be suppressed, which is preferable.

The ratio of the number of Zr atoms in the composite to the number of atoms of the metal elements contained in the composite is preferably 5% to 30%, more preferably from 6% to 28%, and further preferably from 7% to 26%. When the ratio of the number of Zr atoms is 5% or more, CO, which is the reactant of the water gas shift reaction, is likely to be adsorbed onto Rh, which is preferable. On the other hand, when the ratio of the number of Zr atoms is 30% or less, the ratios of the numbers of Al atoms and Ce atoms can be increased and the water gas shift reaction progresses efficiently, which is preferable.

The composite may further contain a metal element other than Al, Ce, or Zr (hereinafter also referred to as "another metal element") as necessary. Another metal element includes Nd, La, Pr, and Y. Among these, Nd or La is preferably contained, and Nd and La are more preferably contained. That is, according to a preferred aspect of the present invention, the composite further contains Nd. According to a preferred aspect of the present invention, the composite further contains La. According to a preferred aspect of the present invention, the composite further contains Nd and La.

When Nd is contained, the ratio of the number of Nd atoms in the composite to the number of atoms of the metal elements contained in the composite is preferably 0.5% to 2.0%, more preferably 0.55% to 1.95%, and further preferably 0.6% to 1.95%. When the ratio of the number Nd atoms is 0.5% or greater, thermal stability of Rh on the composite increases, which is preferable. On the other hand, when the content of Nd atoms is 2.0% or less, the ratios of the numbers of Al atoms and Ce atoms can be increased and the water gas shift reaction progresses efficiently, which is preferable.

When La is contained, the ratio of the number of La atoms in the composite to the number of atoms of the metal elements contained in the composite is preferably from 0.20% to 1.0%, more preferably from 0.22% to 0.9%, and further preferably from 0.24% to 0.85%. When the ratio of the number of La atoms is 0.20% or greater, the thermal stability of the composite increases, which is preferable. On the other hand, when the ratio of the number of La atoms is 1.0% or less, the ratios of the numbers of Al atoms and Ce atoms can be increased and the water gas shift reaction progresses efficiently, which is preferable.

Note that, in the present specification, the ratio (%) of the number of atoms of each element in the composite to the number of atoms of the metal elements contained in the composite is calculated from the result of the XRF analysis disclosed in the examples described later.

The average particle size (diameter) of the composite is preferably 5 µm to 60 µm, more preferably 10 µm to 45 µm, and further preferably 20 µm to 35 µm. When the average particle size is 5 µm or greater, the Al—Ce—Zr composite is less likely to infiltrate into pores in the walls of the support, such as cordierite, and thus the number of catalyst components that function effectively to produce hydrogen increases, which is preferable. On the other hand, the average particle size of 60 µm or less improves dispersibility of the noble metal, which is preferable. Note that, in the present specification, as the average particle size of the composite, a median diameter (D50) measured by a laser diffraction/scattering particle size distribution measurement device is employed.

While the method of producing the Al—Ce—Zr composite is not particularly limited, as an example, the method includes: a step (I) of adding an excessive amount of alkali to an aqueous solution containing Al salt to generate a precipitation of $Al(OH)_3$ and agitating the resulting dispersion to obtain aggregates of $Al(OH)_3$; a step (II) of adding an aqueous solution containing Ce salt and Zr salt to the dispersion containing the aggregates of $Al(OH)_3$ and agitating the resulting dispersion to obtain a precursor; and a step (III) of drying and calcining the precursor to obtain a composite. Each of the steps is described in order below.

Step (I)

In step (I), an excessive amount of alkali is added to an aqueous solution containing an Al salt to generate a precipitation of $Al(OH)_3$, and the resulting dispersion is agitated to obtain the aggregates of $Al(OH)_3$.

The Al salt is preferably dissolved in water, and examples of the Al salt include a halide, such as aluminum chloride; inorganic salts, such as nitrate (aluminum nitrate) and sulfate (aluminum sulfate) of aluminum; and a carboxylate, such as acetate. Among these, a halide, nitrate, sulfate, and acetate are preferred, and a halide, nitrate, and sulfate are more preferred. Only one kind of the Al salt may be used alone, or two or more kinds of the Al salt may be used in combination. The amount of Al salt added is adjusted based on the content of Al in the Al—Ce—Zr composite.

As the water to be used when the aqueous solution containing Al salt is prepared, for example, pure water and ion exchanged water can be used. The amount of water is preferably from 2 mL to 5 mL per gram of the Al salt.

Examples of the alkali added to the aqueous solution containing the Al salt include ammonia water, tetraethylammonium hydroxide, sodium hydroxide, potassium hydroxide, and ammonium carbonate. As the amount of alkali to be added, an amount sufficient to neutralize the aqueous solution containing the Al salt, the Ce salt, and the Zr salt (and Nd salt and/or La salt added as required) added in step (I) and step (II), and precipitate hydroxide salt (in an excessive amount) is added. Specifically, preferably 2 to 5 equivalents, more preferably 3 to 4 equivalents of the alkali in terms of the chemical equivalent (molar equivalent) required for neutralization are added in the step (I). This causes the precipitation of $Al(OH)_3$.

Next, the dispersion containing the precipitation of $Al(OH)_3$ is agitated. The lower limit of the temperature of the dispersion during the agitation is preferably 50° C. or higher, more preferably 60° C. or higher, and further preferably 70° C. or higher; and the upper limit is preferably 90° C. or less, more preferably 80° C. or less, and further preferably 75° C. or less. The lower limit of the agitation time is preferably 30 minutes or more, more preferably 45 minutes or more, most preferably one hour or more; and the upper limit is preferably 24 hours or less, more preferably 12 hours or less, and most preferably five hours or less. Agitation performed under such conditions forms the aggregates of $Al(OH)_3$.

Next, the dispersion is agitated at a temperature around room temperature (o 20° C. to 30° C.) at a high rotational speed of 500 rpm to 10000 rpm. As an agitation device for this a homodisper can be used. Although not particularly limited, the agitation time is preferably 15 minutes or more, more preferably 20 minutes or more, and further preferably 30 minutes or more. Although not particularly limited, the upper limit of the agitation time is preferably three hours or less, more preferably two hours or less, and further preferably one hour or less. More specifically, the agitation time is preferably from 15 minutes to three hours, more preferably from 20 minutes to two hours, and further preferably from 30 minutes to one hour. The high-speed agitation uniforms the sizes of the Al(OH)$_3$ aggregates.

Note that, in the present specification, the aggregates of Al(OH)$_3$ means secondary particles formed through aggregation of primary particles of Al(OH)$_3$. The particle size (secondary particle size) (diameter) of the aggregates of Al(OH)$_3$ uniformed by high-speed agitation is preferably 1 μm to 60 μm, more preferably from 1 μm to 50 μm, and further preferably from 5 μm to 40 μm. Note that the particle size (secondary particle size) of the aggregates of Al(OH)$_3$ means the average particle size (D50) measured by the laser diffraction/scattering particle size distribution measurement device.

Aggregating Al(OH)$_3$ to this size suppresses Al, and Ce and Zr from uniformly dispersing on a nanometer scale. It is considered that forming the aggregates of Al(OH)$_3$ in step (I) allows the Al—Ce—Zr composite, in which Al is accumulated near the surface, to be ultimately obtained.

Step (II)

In step (II), the aqueous solution containing Ce salt and Zr salt (containing Nd and/or La as necessary, and the same applies to the following) is added to the dispersion containing the aggregates of Al(OH)$_3$ obtained in step (I), and the resulting dispersion is agitated to obtain a precursor.

First, the aqueous solution containing the Ce salt and the Zr salt is prepared in advance and added to the dispersion containing the aggregates of Al(OH)$_3$.

The Ce salt is preferably dissolved in water, and examples of the Ce salt include a halide, such as cerium chloride; inorganic salts, such as nitrate (cerous nitrate) and sulfate (cerium sulfate) of cerium; and a carboxylate, such as acetate. Among these, a halide, nitrate, sulfate, and acetate are preferred, and a halide, nitrate, and sulfate are more preferred. Only one kind of Ce salt may be used alone, or two or more kinds of Ce salt may be used in combination. The amount of Ce salt added is adjusted based on the content of Ce in the Al—Ce—Zr composite.

The Zr salt is preferably dissolved in water, and examples of the Zr salt include a halide, such as zirconium chloride; inorganic salts, such as nitrate (zirconium nitrate) and sulfate (zirconium sulfate) of zirconium; and a carboxylate, such as acetate. Among these, a halide, nitrate, sulfate, and acetate are preferred, and a halide, nitrate, and sulfate are more preferred. Only one kind of Zr salt may be used alone, or two or more kinds of Zr salt may be used in combination. The amount of Zr salt added is adjusted based on the content of Zr in the Al—Ce—Zr composite.

Also, when the Al—Ce—Zr composite contains Nd and/or La, Nd salt and/or La salt may be added in addition to the Ce salt and Zr salt.

The Nd salt is preferably dissolved in water, and examples of the Nd salt include a halide, such as neodymium chloride; inorganic salts, such as nitrate (neodymium nitrate) and sulfate (neodymium sulfate) of neodymium; and a carboxylate, such as acetate. Among these, a halide, nitrate, sulfate, and acetate are preferred, and a halide, nitrate, and sulfate are more preferred. Only one kind of Nd salt may be u alone, or two or more kinds of Nd salt may be used in combination. The amount of Nd salt added is adjusted based on the content of Nd in the Al—Ce—Zr composite.

The La salt is preferably dissolved in water, and examples of the La salt include a halide, such as lanthanum chloride; inorganic salts, such as nitrate (lanthanum nitrate) and sulfate (lanthanum sulfate) of lanthanum; and a carboxylate, such as acetate. Among these, a halide, nitrate, sulfate, and acetate are preferred, and a halide, nitrate, and sulfate are more preferred. Only one kind of La salt may be used alone, or two or more kinds of La salt may be used in combination. The amount of La salt added is adjusted based on the content of La in the Al—Ce—Zr composite.

As the water to be used when the aqueous solution containing the Ce salt and the Zr salt is prepared, for example, pure water and ion exchanged water can be used. The amount of water is preferably 2 mL to 5 mL per gram of the salt to be dissolved.

Then, the aqueous solution containing the Ce salt and the Zr salt is added to the dispersion containing the aggregates of Al(OH)$_3$ and agitated. The agitation temperature at this time is preferably around room temperature (20° C. to 30° C.). The lower limit of the agitation time is preferably 15 minutes or more, more preferably 20 minutes or more, further preferably 30 minutes or more; and the upper limit is preferably three hours or less, more preferably two hours or less, and further preferably one hour or less. By this agitation, the precursor of the Al—Ce—Zr composite (containing Nd and/or La as necessary), where the precursor of Ce (hydroxide) and the precursor of Zr (hydroxide) (when the Nd salt and/or the La salt is added, the precursor of Nd (hydroxide) and/or the precursor of La (hydroxide)) are formed in crevasses in the aggregates of Al(OH)$_3$, is obtained.

Furthermore, as necessary, the dispersion containing the precursor of the Al—Ce—Zr composite may be agitated at room temperature (20° C. to 30° C.), for preferably 15 minutes or more, more preferably 20 minutes or more, further preferably 30 minutes or more; preferably three hours or less, more preferably two hours or less, and further preferably one hour or less to mature the precursor.

After that, the precursor is collected by filtration, then washing with water and filtration thereof are repeated preferably three to five times, more preferably four and five times, and further preferably five times to obtain a precursor.

Step (III)

In step (III), the precursor obtained in the step (II) is dried and calcined to obtain the Al—Ce—Zr composite.

The lower limit of the temperature during drying and calcining the precursor obtained in step (II) is preferably 100° C. or higher, more preferably 110° C. or higher, and further preferably 120° C. or higher; and the upper limit is preferably 1000° C. or lower, more preferably 950° C. or lower, further preferably 900° C. or lower, and particularly preferably 800° C. or lower. The lower limit of the time for the drying and calcining is preferably 30 minutes or more, more preferably 45 minutes or more, further preferably one hour or more; the upper limit is preferably 15 hours or less, more preferably 12 hours or less, and further preferably 10 hours or less. The drying and calcining may be performed as different steps or may be performed continuously.

With the manufacturing method described above, the Al—Ce—Zr composite, in which Al is accumulated near the surface, can be obtained. Note that the surface Al accumulation rate can be controlled by adjusting the particle size of the aggregates of Al(OH)$_3$ or the calcination temperature of the precursor of the Al—Ce—Zr composite. To increase the surface Al accumulation rate, the particle size of the aggregates of Al(OH)$_3$ only needs to be increased. Specifically, by agitating the dispersion containing the precipitation of Al(OH)$_3$ at preferably 50° C. or higher and more preferably 70° C. or higher, or by not using a dispersant, such as polyethyleneimine, during the preparation of the precursor, the particle size of the aggregates of Al(OH)$_3$ can be increased. In addition, by increasing the calcination temperature of the precursor of the Al—Ce—Zr composite, the surface Al accumulation ratio can be increased.

Rh

Rh is indispensable in the hydrogen-producing catalyst. Rh functions as a catalyst for the water gas shift reaction. The lower limit of the amount of Rh in the hydrogen-producing catalyst is preferably 0.05 parts by mass or more, more preferably 0.1 parts by mass or greater, and further preferably 0.5 parts by mass or greater, relative to 100 parts by mass of the Al—Ce—Zr composite. When the amount of Rh is 0.05 parts by mass or greater, the water gas shift reaction can progress efficiently. On the other hand, in consideration of a balance between the upper limit of the amount of Rh, the cost of Rh, and the hydrogen generation properties, the amount is preferably 2.0 parts by mass or less, more preferably 1.0 parts by mass or less, and further preferably 0.9 parts by mass or less, to 100 parts by mass of the Al—Ce—Zr composite. The range of the amount of Rh is preferably 0.05 to 2.0 parts by mass, more preferably 0.1 to 1.0 parts by mass, and 0.5 to 0.9 parts by mass, relative to 100 parts by mass of the Al—Ce—Zr composite.

While the form of Rh present in the hydrogen-producing catalyst is not particularly limited, preferably Rh and the Al—Ce—Zr composite are present in the same layer, more preferably at least a part of Rh is in contact with the Al—Ce—Zr composite, and further preferably Rh is supported on the Al—Ce—Zr composite. Whether Rh is supported on the Al—Ce—Zr composite can be confirmed by transmission electron microscopy-energy dispersive X-ray spectroscopy (TEM-EDS). Point analysis is performed by TEM-EDS. If Rh is detected at a point, where Al, Ce, and Zr are detected, Rh is supported on the Al—Ce—Zr composite.

Production Method of Hydrogen

According to another one aspect of the present invention, a method of producing hydrogen that brings the hydrogen-producing catalyst in contact with CO and $H_2O$ is provided.

The gas contacting the hydrogen-producing catalyst contains at least CO and $H_2O$ and may contain, for example, oxygen $O_2$, NOx, HC, and $CO_2$ in addition to CO and $H_2O$. The CO concentration in the gas is preferably 1.5 vol. % or less, more preferably 1 vol. % or less, and further preferably 7000 volume ppm or less. The amount of $H_2O$ is preferably an amount at which the water gas shift reaction stoichiometrically progresses according to the amount of CO. Since $O_2$ is likely to react with CO, $O_2$ inhibits the water gas shift reaction. Therefore, a smaller $O_2$ concentration in the gas is more preferred, and the concentration is preferably 1 vol. % or less and more preferably 0.6 vol. % or less. The gas temperature when contacting the hydrogen-producing catalyst is preferably 100° C. or higher, preferably 140° C. or higher, and more preferably 180° C. or higher. When the temperature is 100° C. or higher, the amount of water in liquid form is small and the water gas shift reaction is likely to progress, which is preferable. Furthermore, the gas temperature is preferably 1100° C. or lower, more preferably 1000° C. or lower, and further preferably 500° C. or lower. The temperature of 1100° C. or lower allows to suppress deterioration of the catalyst, which is preferable.

Exhaust Gas Purifying Catalyst

According to another one aspect of the present invention, an exhaust gas purifying catalyst containing the hydrogen-producing catalyst described above is provided. That is, the exhaust gas purifying catalyst according to another aspect of the present invention preferably includes a catalyst layer that contains the hydrogen-producing catalyst and further includes another catalyst layer on the carrier. The total number of catalyst layers included in the exhaust gas purifying catalyst (the total number of the catalyst layers containing the hydrogen-producing catalyst and the other catalyst layers) is not particularly limited, but is preferably from one to four layers, more preferably from one to three layers, further preferably two to three layers, and particularly preferably two layers.

According to one preferred aspect, at least one layer among the other catalyst layers contains Pd. Providing another catalyst layer containing Pd allows efficient purification of HC, as well as CO. The position of the other catalyst layer containing Pd is not particularly limited. The other catalyst layer may be provided between the carrier and the catalyst layer containing the hydrogen-producing catalyst, or may be provided on closer to the surface than the catalyst layer containing the hydrogen-producing catalyst. That is, an aspect in which a lower catalyst layer containing Pd and an upper catalyst layer containing the hydrogen-producing catalyst are sequentially layered on the carrier may be employed; or an aspect in which a lower catalyst layer containing the hydrogen-producing catalyst and an upper catalyst layer containing Pd are sequentially layered on the carrier may be employed. Among these, the aspect in which the lower catalyst layer containing Pd and the upper catalyst layer containing the hydrogen-producing catalyst are sequentially layered on the carrier is preferred, and the aspect in which the catalyst layer containing the hydrogen-producing catalyst is located on the uppermost layer on the carrier is more preferred. By disposing the catalyst layer containing the hydrogen-producing catalyst and the other catalyst layer containing Pd as described above, the Rh in the layer located on the uppermost layer is continuously reduced. As a result, adsorption of CO and NOx is enhanced, and the purification of HC is also enhanced. The exhaust gas purifying catalyst according to the present invention with this structure exhibits excellent purification performance of CO, HC, and NOx in the exhaust gas.

As described above, it is considered that in the Al—Ce—Zr composite contained in the hydrogen-producing catalyst, since Al is accumulated near the upper layer, $Rh^0$ as the reductant is dominantly present on the Rh surface. $Rh^0$ has the property of adsorbing oxygen atom (O)-containing gas, such as CO, and therefore CO, NOx, and $O_2$ are sufficiently adsorbed onto the Rh surface. The CO is also purified by reacting with water through the water gas shift reaction described above and generates $CO_2$ and $H_2$. The HC is purified by being oxidized by $O_2$ supplied to the Rh surface. The NOx is purified by being reduced by $H_2$ resulting from the water gas shift reaction. As a result, it is considered that by using the exhaust gas purifying catalyst according to the present invention, excellent purification performance can be exhibited on CO, NOx, and $O_2$ in the exhaust gas.

Hereinafter, each structure for the exhaust gas purifying catalyst is described in detail.

[Carrier]

The exhaust gas purifying catalyst includes catalyst layers formed on a support. As the carrier, any carrier used in this technical field can be appropriately employed, and a three-dimensional integrated structure (monolith carrier) (hereinafter also referred to as "three-dimensional structure") is preferably used. Specific examples include a monolithic honeycomb carrier, a metal honeycomb carrier, and a plug honeycomb carrier.

The three-dimensional structure is preferably a refractory three-dimensional structure made of a refractory material. Examples of the refractory material include a ceramic material, such as cordierite, mullite, α-alumina, zirconia, titania, titanium phosphate, aluminum titanate, petalite, spodumene, aluminosilicate, and magnesium silicate. Among these, the three-dimensional structure made of cordierite is preferred. In addition, a structure formed as the refractory three-dimensional structure using an oxidation-resistant, heat-resistant refractory metal, such as stainless steel and Fe—Cr—Al alloy, is also used.

The refractory three-dimensional structure is a wall-flow type or a flow-through type, and manufactured by, for example, an extrusion molding method and a method of winding and fixing a sheet-like element. Shapes of gas passages (cell shapes) may be any of a hexagon, a square, a triangle, or a corrugation shape. A cell density (cell count/unit cross-sectional area) of 100 to 1200 cells per square inch (15.5 to 186 cells per square centimeter) (1 inch=25.4 mm) is sufficiently usable, and the cell density is preferably from 200 to 900 cells per square inch (31 to 139.5 cells per square centimeter).

The total length of the refractory three-dimensional structure is preferably 10 mm to 1000 mm, more preferably 15 mm to 300 mm, and further preferably from 20 mm to 150 mm.

[Catalyst Layer Containing Hydrogen-Producing Catalyst, Another Catalyst Layers]

The catalyst layer containing the hydrogen-producing catalyst is indispensable in the exhaust gas purifying catalyst, and the exhaust gas purifying catalyst can include another catalyst layer as required. Note that "another catalyst layer" in the present specification means a catalyst layer that does not contain the hydrogen-producing catalyst. The catalyst layer containing the hydrogen-producing catalyst and another catalyst layer can appropriately contain components, such as a noble metal, an oxygen storage material, refractory inorganic oxide, and a co-catalyst, used in this technical field as required. The components of these catalyst layers are described below.

Hydrogen-Producing Catalyst

The hydrogen-producing catalyst is indispensable in the catalyst layer containing the hydrogen-producing catalyst. The embodiments of the hydrogen-producing catalyst have already been described in the section of Hydrogen-Producing Catalyst, and thus a detailed description thereof is omitted.

The amount of the hydrogen-producing catalyst (the total amount of Al—Ce—Zr composite and Rh) is preferably 30.05 g to 162 g, more preferably 40.1 g to 81 g, and further preferably 50.4 g to 60 g per liter of the refractory three-dimensional structure. Among these, the amount of the Al—Ce—Zr composite contained in the hydrogen-producing catalyst is preferably 30 g to 160 g, more preferably 40 g to 80 g, and further preferably 50 g to 60 g per liter of the refractory three-dimensional structure. The amount of Rh contained in the hydrogen-producing catalyst is preferably the amount described in "Rh" above. With the amount of the hydrogen-producing catalyst (Rh and Al—Ce—Zr composite) described above, the hydrogen generation can progress efficiently and the efficiency of purifying CO, HC, and NOx can be enhanced.

Noble Metal

The noble metal functions as a catalyst for oxidation reaction of CO and HC and reduction reaction of NOx contained in the exhaust gas. As the noble metal, elements that can be used in this technical field, such as platinum (Pt), palladium (Pd), and rhodium (Rh), can be appropriately employed. Among these, at least one kind of Pt, Pd, and Rh is more preferred, and Pd is preferred. With these noble metals the oxidation and reduction reactions progress efficiently. Only one kind of these noble metals may be used alone, or two or more kinds may be used in combination.

From the perspective of balance between the exhaust gas purification performance and the cost, the amount of Pt is preferably 0 g to 5 g, more preferably 0.2 g to 4 g, and further preferably 0.5 g to 3 g per liter of the refractory three-dimensional structure in terms of Pt. From the perspective of balance between the exhaust gas purification performance and the cost, the amount of Pd is preferably 0.1 g to 15 g, more preferably 0.2 g to 10 g, and further preferably 0.5 g to 10 g per liter of the refractory three-dimensional structure in terms of Pd. From the perspective of balance between the exhaust gas purification performance and the cost, the amount of Rh is preferably 0 g to 3 g, more preferably 0.1 g to 2 g, and further preferably 0.1 g to 0.5 g per liter of the refractory three-dimensional structure in terms of Rh.

Note that the Rh described in this section is Rh other than the Rh contained in the hydrogen-producing catalyst. That is, the exhaust gas purifying catalyst may contain Rh, other than the Rh contained in the hydrogen-producing catalyst, in the catalyst layer containing the hydrogen-producing catalyst and/or another catalyst layer so that the exhaust gas purification efficiently progresses.

[Oxygen Storage Material]

The oxygen storage material (also referred to as "oxygen storage release material") has the function of storing oxygen in an oxidizing atmosphere (lean) and releasing oxygen in a reductive atmosphere (rich) according to variations in the air-fuel ratio (A/F), which changes according to the operating conditions so that oxidation and reduction reactions progress efficiently.

As the oxygen storage material, the use of a cerium-zirconium composite oxide ($CeO_2$—$ZrO_2$) with fast oxygen storage release rate is preferred. The cerium-zirconium composite oxide may contain, for example, lanthanum (La), yttrium (Y), neodymium (Nd), and praseodymium (Pr). Specific examples include cerium-zirconium-lanthanum composite oxide and cerium-zirconium-lanthanum-yttrium composite oxide.

When the exhaust gas purifying catalyst includes at least a lower catalyst layer and an upper catalyst layer, at least one of the lower catalyst layers and preferably the upper catalyst layer contains a composite oxide containing $CeO_2$ and $ZrO_2$, and both of the lower catalyst layers and the upper catalyst layer more preferably contain a composite oxide containing $CeO_2$ and $ZrO_2$.

The amount of the oxygen storage material in terms of oxide is preferably 5 g to 200 g, more preferably 5 g to 100 g, and further preferably 5 g to 50 g per liter of the refractory three-dimensional structure. Among these, the amount of Ce contained in the oxygen storage material in terms of oxide ($CeO_2$) is preferably 5 g to 200 g, more preferably 5 g to 100 g, and further preferably 5 g to 50 g per liter of the refractory three-dimensional structure. The amount of Zr contained in the oxygen storage material in terms of oxide ($ZrO_2$) is preferably 5 g to 200 g, more preferably 10 g to 150 g, and further preferably 20 g to 100 g per liter of the refractory three-dimensional structure. The amount of La contained in the oxygen storage material in terms of oxide ($La_2O_3$) is preferably 1 g to 50 g, more preferably 1 g to 35 g, and further preferably 1 g to 20 g per liter of the refractory three-dimensional structure. Furthermore, the amount of Y contained in the oxygen storage material in terms of oxide ($Y_2O_3$) is preferably 0 g to 50 g, more preferably 0 g to 35 g, and further preferably 0 g to 20 g per liter of the refractory three-dimensional structure. The amount of Nd contained in the oxygen storage material in terms of oxide ($Nd_2O_3$) is preferably 0 g to 50 g, more preferably 0 g to 35 g, and further preferably 0 g to 20 g per liter of the refractory three-dimensional structure. The amount of Pr contained in the oxygen storage material in terms of oxide ($Pr_6O_{11}$) is preferably 0 g to 50 g, more preferably 0 g to 35 g, and further preferably 0 g to 20 g per liter of the refractory three-dimensional structure. Containing the amounts of oxygen storage materials (Ce, Zr, La, Y, Nd, and/or Pr) as described above, the oxidation and reduction reactions progress stably.

The oxygen storage material has a crystal structure of, for example, a cubic crystal, a tetragonal crystal, a monoclinic crystal, and an orthorhombic crystal, but preferably has the cubic crystal, the tetragonal crystal, and the monoclinic crystal, and more preferably has the cubic crystal and the tetragonal crystal.

[Refractory Inorganic Oxide]

The refractory inorganic oxide has a high specific surface area where the catalyst component can be supported, the contact area between the catalyst components and the exhaust gas can be increased, and the reactant can be adsorbed. As a result, reactivity of the entire catalyst can be further increased.

The refractory inorganic oxide preferably exhibits a small change in specific surface area at a temperature of 700° C. or more, and preferably 1000° C. or more. A BET specific surface area of the refractory inorganic oxide is preferably 50 $m^2$/g to 750 $m^2$/g and more preferably 150 $m^2$/g to 750 $m^2$/g from the perspective of supporting the catalyst components.

The melting point of the refractory inorganic oxide is preferably 1000° C. or more, more preferably 1000° C. to 3000° C., and further preferably 1500° C. to 3000° C.

While the refractory inorganic oxide may have any form, such as granular, particulate, powdery, cylindrical, conical, prismatic, cubic, pyramidal, and amorphous, but may be preferably in granular, particulate, powdery, and more preferably powdery form. When the refractory inorganic oxide is in granular, particulate, or powdery form, the average primary particle size of the refractory inorganic oxide is preferably 5 nm to 20 nm and more preferably 5 nm to 10 nm. In such a range, the catalyst components can be supported on the refractory inorganic oxide surface. Note that, in the present specification, the shape and average primary particle size of the refractory inorganic oxide can be measured by transmission electron microscopy (TEM).

Examples of the refractory inorganic oxide can include α-alumina, activated alumina, such as γ-alumina, δ-alumina, η-alumina, or θ-alumina, lanthanum-containing alumina (lanthana-alumina), zeolite, titania, zirconia, and silicon oxide. Among these, the refractory inorganic oxide is preferably activated alumina. Only one kind of these refractory inorganic oxides may be used alone, or two or more kinds may be used in combination. Examples of the combined use of two or more kinds includes alumina-titania, alumina-zirconia, and titania-zirconia.

The amount of the refractory inorganic oxide is preferably 10 g to 300 g and more preferably 50 g to 200 g per liter of the refractory three-dimensional structure. When the amount of the refractory inorganic oxide per liter of the refractory three-dimensional structure is 10 g or more, the noble metal can be sufficiently dispersed, and a catalyst that is sufficiently durable can be obtained. On the other hand, when the amount of the refractory three-dimensional structure is 300 g or less, contact between the noble metal and the exhaust gas is satisfactory, and exhaust gas purification performance can be sufficiently exhibited.

[Co-Catalyst]

Group 2 elements, such as magnesium (Mg), calcium (K), strontium (Sr), and barium (Ba), have, as a co-catalyst, a property of suppressing the reduction of palladium oxide to metallic palladium at high temperatures. These elements may be contained in the exhaust gas purifying catalyst in the form of oxide, sulfate, or carbonate. Among these, Ba is preferably used as the co-catalyst, and barium sulfate ($BaSO_4$) is more preferably used as the co-catalyst. Only one kind of these co-catalysts may be used alone, or two or more kinds may be used in combination.

The amount of $BaSO_4$ is preferably 0 g to 50 g, more preferably 0.5 g to 30 g, and further preferably 0.5 g to 20 g per liter of the refractory three-dimensional structure.

[Method of Producing Exhaust Gas Purifying Catalyst]

While the exhaust gas purifying catalyst can be easily produced by a person skilled in the art by appropriately referencing known methods, as one preferred aspect, there is a method of producing exhaust gas purifying catalyst including (a) a slurry preparation step, (b) a slurry application step, and (c) a drying and calcining step. Each of the steps (a) to (c) is described in detail below.

(a) Slurry Preparation Step

The slurry preparation step is a step of preparing a slurry containing the raw materials which will form each catalyst component (Al—Ce—Zr composite, noble metal, refractory inorganic oxide, oxygen storage material, and co-catalyst) described above after performing the drying and calcining step described later. The slurry is prepared by mixing the raw materials of the respective catalyst components in an aqueous medium and wet milling. Note that as the raw materials of the respective catalyst components, materials used in this technical field can be appropriately employed.

As the aqueous medium, for example, water (pure water), a lower alcohol, such as ethanol and 2-propanol, and an organic alkaline aqueous solution can be used. Among these, water and/or a lower alcohol is preferably used, and water is more preferably used. The slurry is prepared such that a proportion of solid is preferably 5 mass % to 60 mass % and more preferably 10 mass % to 50 mass %.

The wet milling can be performed by, for example, the known method using, for example, a ball mill.

In the slurry preparation step, after the refractory inorganic oxide is added to the aqueous medium and agitated for five minutes to 24 hours, the Al—Ce—Zr composite is added and agitated for five minutes to 24 hours, and then the oxygen storage material and the co-catalyst may be added. The slurry to which these catalyst components have been added is agitated for five minutes to 24 hours, and then wet milled. When the pH of the slurry immediately prior to the wet milling is 10 or more and preferably 8 or more, the pH is returned to less than 10 and preferably less than 8 with an acid, such as nitric acid, and then the wet milling may be performed. When the pH of the slurry immediately prior to the wet milling is less than 2, and preferably less than 4, the pH is returned to 2 or more and preferably 4 or more with a base, such as ammonia water, and then the wet milling may be performed.

Note that when the exhaust gas purifying catalyst has two or more catalyst layers, a slurry is prepared for each of the catalyst layers. For example, when two catalyst layers are provided (when a lower catalyst layer and an upper catalyst layer are provided), a first slurry for forming the lower catalyst layer and a second slurry for forming the upper catalyst layer are prepared in the slurry preparation step. The first slurry and the second slurry may contain noble metals different from each other. Specifically, for example, the slurries may be prepared such that one of the first slurry and the second slurry my contain Pd (PdO) and the other may contain Rh.

(b) Slurry Application Step

The slurry application step is a step of applying the slurry obtained in the slurry preparation step onto the refractory three-dimensional structure. As method of applying the slurry on the refractory three-dimensional structure, a known method can be appropriately employed. The amount of slurry applied may be appropriately set by a person skilled in the art according to the amount of solid in the slurry and the thickness of the catalyst layer to be formed.

(c) Drying and Calcining Step

The drying and calcining step is a step of drying and calcining the slurry on the refractory three-dimensional structure applied in the slurry application step. When performing the drying and calcining step, drying and calcination may be performed as separate steps as long as each of the catalyst components can be supported on the refractory three-dimensional structure, but the drying and the calcination may be performed as a single heat treatment with no distinction between the drying step and the calcining step.

In the drying step, the slurry is dried in air, preferably at a temperature of 50° C. to 300° C., more preferably 80° C. to 200° C., and for five minutes to 10 hours, and preferably 30 minutes to eight hours.

In the calcining step, the slurry dried in the drying step is calcined in air, preferably at a temperature of 300° C. to 1200° C. and preferably 400 700° C. to, and for 10 minutes to 10 hours and preferably 30 minutes to five hours.

Note that when the two catalyst layers are formed on the refractory three-dimensional structure, the first slurry is applied on the refractory three-dimensional structure, the drying and calcining step is performed to form the lower catalyst layer, and then the second slurry is applied to the lower catalyst layer and the drying and calcining step is performed to form the upper catalyst layer. As a result, the exhaust gas purifying catalyst in which two layers of a lower catalyst layer and an upper catalyst layer are layered on the refractory three-dimensional structure can be produced. In addition, to increase the thickness of the catalyst layer, it is only necessary to repeat each of the steps (a) to (c) using the same slurry.

[Method of Purifying Exhaust Gas]

According to another one aspect of the present invention, a method of purifying exhaust gas using the exhaust gas purifying catalyst is provided, the method including: a step of bringing the catalyst layer containing the hydrogen-producing catalyst in contact with CO and $H_2O$ to generate hydrogen; and a step of bringing the catalyst layer containing the hydrogen-producing catalyst and/or the other catalyst layer in contact with the hydrogen and NOx. According to the method of purifying exhaust gas according to the aspect, the hydrogen is produced from CO and $H_2O$ (water gas shift reaction) by the hydrogen-producing catalyst contained in the exhaust gas purifying catalyst. Furthermore, with the hydrogen functioning as a reducing agent of NOx in the exhaust gas, the exhaust gas can be effectively purified.

Although the exhaust gas is not particularly limited as long as the exhaust gas contains at least CO, NOx, and $H_2O$, the exhaust gas is preferably an exhaust gas in an internal combustion engine. Examples of the exhaust gas include exhaust gas that contains, for example, nitrogen oxide (for example, NO, $NO_2$, $N_2O$), carbon monoxide (CO), carbon dioxide ($CO_2$), oxygen ($O_2$), hydrogen ($H_2$), ammonia ($NH_3$), water ($H_2O$), sulfur dioxide ($SO_2$), and hydrocarbons (HC) at given proportions.

The internal combustion engine to which the exhaust gas purification method of this aspect is applied to is not particularly limited, and examples of the internal combustion engine can include a gasoline engine, a gasoline hybrid engine, and an engine using natural gas, ethanol, and dimethyl ether as a fuel. Among these, the gasoline engine is preferred.

Examples of the method of bringing the exhaust gas in contact with the exhaust gas purifying catalyst include a method in which, with the exhaust gas purifying catalyst being installed in an exhaust flow path of an exhaust port of the internal combustion engine, the exhaust gas is caused to flow into the exhaust flow path.

The temperature of the exhaust gas is preferably 0° C. to 800° C., that is, temperatures within a temperature range of the exhaust gas during normal operation of the internal combustion engine. Here, an air-fuel ratio (A/F) of the exhaust gas in the internal combustion engine at the temperature of 0° C. to 800° C. is 10 to 30 and preferably 11 to 14.7.

As another one preferred aspect, the temperature of the exhaust gas may be in a high-temperature region of 800° C. to 1200° C. Here, the air-fuel ratio of the exhaust gas in the internal combustion engine at the temperature of 800° C. to 1200° C. is preferably from 10 to 18.6.

Furthermore, the exhaust gas purifying catalyst according to the present invention can exhibit excellent exhaust gas purification performance even after being exposed to high temperature exhaust gas over a long period of time. In other words, in one preferred aspect of the exhaust gas purification method according to the present invention, after the exhaust gas purifying catalyst is exposed to high-temperature exhaust gas for five to 500 hours such that a temperature of a catalyst bed is 800° C. to 1200° C., the exhaust gas purifying catalyst is brought into contact with CO, NOx, and $H_2O$.

In the present specification, "temperature of exhaust gas" means the temperature of the exhaust gas at the catalyst inlet. Here, the "catalyst inlet" refers to a part extending 20 cm from a catalyst end surface on an exhaust gas inflow side toward the internal combustion engine side in the exhaust pipe, to which the exhaust gas purifying catalyst is installed, and also refers to the center part in a longitudinal direction (axial direction) of the exhaust pipe. Furthermore, in the present specification, then "catalyst bed" refers to the center part between the catalyst end surface on the exhaust gas inflow side and the catalyst end surface on the exhaust gas outflow side in the exhaust pipe, and also refers to the center part of the cross-sectional surface of the exhaust pipe (when the cross-sectional surface of the exhaust pipe does not have a circular shape, the center of gravity of the cross-sectional surface of the exhaust pipe).

EXAMPLES

The present invention is further specifically described below using examples and comparative examples, but the present invention is not limited to the following examples. Note that unless otherwise specified, each operation was performed under conditions of room temperature (25° C.)/relative humidity 40% RH to 50% RH. In addition, unless otherwise specified, a ratio represents a mass ratio.

Preparation of Al—Ce—Zr Compound

Example 1

Aluminum chloride as an aluminum raw material, cerium chloride as a cerium raw material, zirconium chloride as a zirconium raw material, lanthanum chloride as a lanthanum raw material, and neodymium chloride as a neodymium raw material were weighed such that Al:Ce:Zr:La:Nd was 73:10: 15:0.7:1.3 (molar ratio). After the weighed aluminum chloride was dispersed in pure water, ammonia at 3.3 equivalents of aluminum chloride, 3.3 equivalents of cerium chloride, 4.4 equivalents of zirconium chloride, 3.3 equivalents of lanthanum chloride, and 3.3 equivalents of neodymium chloride was added as ammonia water (28 mass %) thereby generating a precipitation of $Al(OH)_3$. The temperature of the obtained dispersion was increased to 70° C., and the dispersion was agitated for one hour at a rotational speed of 350 rpm by a three-one motor thereby obtaining aggregates of $Al(OH)_3$. Thereafter, it was agitated at 25° C. for 30 minutes at high speed, i.e., a rotational speed of 3000 rpm, by homodisper to obtain a dispersion a1 containing the aggregates of $Al(OH)_3$. The average particle size (D50) of the aggregates in the dispersion a1 measured by the laser diffraction/scattering particle size distribution measurement device was 35 μm.

Next, cerium chloride, zirconium chloride, lanthanum chloride, and neodymium chloride were dissolved in 3000 mL of pure water and agitated at 25° C. for 30 minutes at a rotational speed of 350 rpm by a three-one motor thereby obtaining a solution a2. The solution a2 was added to the dispersion a1 and agitated at 25° C. for 30 minutes at a rotational speed of 350 rpm by the three-one motor thereby obtaining a precursor dispersion a3 of an Al—Ce—Zr composite.

Next, the precursor in the precursor dispersion a3 was collected by filtration, and washing with water and filtration were repeated five times. After the obtained precursor was dried at 150° C. for eight hours, the precursor was calcined at 700° C. for one hour thereby obtaining an Al—Ce—Zr composite A. The average particle size (D50) of the thus obtained Al—Ce—Zr composite A measured by the laser diffraction/scattering particle size distribution measurement device was 25 μm.

Example 2

With the exception that the calcination temperature was set to 900° C., an Al—Ce—Zr composite B was obtained similarly to Example 1. The average particle size (D50) of the thus obtained Al—Ce—Zr composite B measured by the laser diffraction/scattering particle size distribution measurement device was 20 μm.

Comparative Example 1

Aluminum nitrate nonahydrate as an aluminum raw material, cerium nitrate hexahydrate as a cerium raw material, zirconium oxynitrate dihydrate as a zirconium raw material, lanthanum nitrate hexahydrate as a lanthanum raw material, neodymium nitrate hexahydrate as a neodymium raw material were weighed such that Al:Ce:Zr:La:Nd was 73:10:15: 0.7:1.3 (molar ratio). The aluminum nitrate nonahydrate, commercially available polyethyleneimine, and 65 mass % of nitric acid were added to pure water, and the result was agitated at 25° C. for 30 minutes at a rotational speed of 350 rpm by a three-one motor thereby obtaining a dispersion c1. Next, the cerium nitrate hexahydrate, the zirconium oxynitrate dihydrate, the lanthanum nitrate hexahydrate, and the neodymium nitrate hexahydrate were added to pure water, and the result was agitated at 25° C. for 30 minutes at a rotational speed of 350 rpm by a three-one motor thereby obtaining a solution c2. The dispersion c1 and the solution c2 were mixed and agitated at 25° C. for 30 minutes at high speed, i.e., a rotational speed of 3000 rpm, by homodisper thereby obtaining a precursor dispersion c3 of an Al—Ce—Zr composite.

Next, the precursor in the precursor dispersion c3 was collected by filtration, and washing with water and filtration were repeated five times. After the obtained precursor was dried at 150° C. for eight hours, the precursor was calcined at 900° C. for five hours thereby obtaining an Al—Ce—Zr composite C.

Comparative Example 2

The raw materials were each weighed in the same manner as in Comparative Example 1. The aluminum nitrate nonahydrate, the cerium nitrate hexahydrate, the zirconium oxynitrate dihydrate, the lanthanum nitrate hexahydrate, and the neodymium nitrate hexahydrate were added to pure water and agitated at 25° C. for 30 minutes at a rotational speed of 350 rpm by a three-one motor thereby obtaining a solution d1. Next, the commercially available polyethyleneimine and 65 mass % of nitric acid were added to pure water and agitated at 25° C. for 30 minutes at a rotational speed of 350 rpm by a three-one motor thereby obtaining a dispersion d2. The solution d1 and the dispersion d2 were mixed and agitated at 25° C. for 30 minutes at high speed, i.e., a rotational speed of 3000 rpm, by homodisper thereby obtaining a precursor dispersion d3 of an Al—Ce—Zr composite.

Next, the precursor in the precursor dispersion d3 was collected by filtration, and washing with water and filtration were repeated five times. After the obtained precursor was dried at 150° C. for eight hours, the precursor was calcined at 900° C. for five hours thereby obtaining an Al—Ce—Zr composite D.

Comparative Example 3

Boehmite as an aluminum raw material, cerium nitrate hexahydrate as a cerium raw material, zirconium oxynitrate dihydrate as a zirconium raw material, lanthanum nitrate hexahydrate as a lanthanum raw material, neodymium nitrate hexahydrate as a neodymium raw material were weighed such that Al:Ce:Zr:La:Nd was 73:10:15:0.7:1.3 (molar ratio). The cerium nitrate hexahydrate, the zirconium oxynitrate dihydrate, the lanthanum nitrate hexahydrate, and the neodymium nitrate hexahydrate were added to pure water and agitated at 25° C. for 30 minutes at a rotational speed of 350 rpm by a three-one motor thereby obtaining a solution e1. Next, commercially available polyethyleneimine and 65 mass % of nitric acid were added to pure water and agitated at 25° C. for 30 minutes at a rotational speed of 350 rpm by a three-one motor thereby obtaining a dispersion e2. The solution e1 and the dispersion e2 were mixed and agitated at 25° C. for 30 minutes at high speed, i.e., a rotational speed of 3000 rpm, by homodisper thereby obtaining a dispersion e3. Next, the boehmite was added to pure water and agitated at 25° C. for 30 minutes at a rotational speed of 350 rpm by a three-one motor thereby obtaining a dispersion e4. The dispersion e3 and the dispersion e4 were mixed and agitated at 25° C. for 30 minutes at a rotational speed of 350 rpm by a three-one motor thereby obtaining a precursor solution e5 of an Al—Ce—Zr composite. Next, the precursor in the precursor dispersion e5 was collected by filtration, and washing with water and filtration were repeated five times. After the obtained precursor was dried at 150° C. for eight hours, the precursor was calcined at 700° C. for one hour thereby obtaining an Al—Ce—Zr composite E.

Comparative Example 4

Up to the step for obtaining the dispersion e3, the example was carried out similarly to Comparative Example 3. After the washing with water and filtration were repeated five times on the dispersion e3 and the obtained precursor was dried at 150° C. for eight hours, the precursor was calcined at 550° C. for one hour thereby obtaining a $CeO_2$—$ZrO_2$—$La_2O_3$—$Nd_2O_3$ composite oxide. The boehmite and 65 mass % of nitric acid were added to pure water, and the mixture was agitated at 25° C. for one hour at a rotational speed of 350 rpm by a three-one motor thereby obtaining a dispersion f1. The $CeO_2$—$ZrO_2$—$La_2O_3$—$Nd_2O_3$ composite oxide was added to this solution and agitated at 25° C. for two hours at a rotational speed of 350 rpm by a three-one motor. A precursor solution f2 of an Al—Ce—Zr composite containing La and Nd was obtained. Next, the precursor in the precursor dispersion f2 was collected by filtration, and washing with water and filtration were repeated five times. After the obtained precursor was dried at 150° C. for eight hours, the precursor was calcined at 700° C. for one hour thereby obtaining an Al—Ce—Zr composite F.

Example 3

An Al—Ce—Zr composite G was obtained in the same manner as in Example 1 with the exception that the weight of the aluminum chloride was increased by 20% and the weights of the cerium chloride and the zirconium chloride were each decreased by 50%. The average particle size (D50) of the thus obtained Al—Ce—Zr composite G measured by the laser diffraction/scattering particle size distribution measurement device was 29 μm.

Example 4

An Al—Ce—Zr composite H was obtained in the same manner as in Example 1 with the exception that the weight of the aluminum chloride was decreased by 25% and the weights of the cerium chloride and the zirconium chloride were each increased by 75%. The average particle size (D50) of the thus obtained Al—Ce—Zr composite H measured by the laser diffraction/scattering particle size distribution measurement device was 22 μm.

The Surface Al Accumulation Rate ($R_2/R_1$) for each Al—Ce—Zr composite produced as described above was measured by fluorescence X-ray (XRF) analysis and an X-ray photoelectron spectroscopy (XPS) method thereby calculating the surface Al accumulation rate ($R_2/R_1$).

The XRF analysis was performed using S8 TIGER (wavelength dispersion type, Rh tube) manufactured by BRUKER ANALYTIK. The composite was milled by a disc mill, and pressed by a press to have a circular plate shape with a diameter of 31 mm and a thickness of 5 mm, which was used as a sample. A proportion of the respective numbers of atoms (%) when the total number of atoms of Al, Ce, Zr, La, and Nd (namely, all metal elements) was defined as 100% was calculated from the obtained spectrum. The results are shown in the following Table 1.

The XPS measurement was performed using Quantera SXM (X-ray source: Al Kα) available from ULVAC-PHI. As a value of a device-specific atomic relative sensitivity factor, 84.084 was used for Al2p, 880.516 was used for Zr3d, and 881.059 was used for Ce3d. Powdery composite produced by pulverizing the composite with a mortar was used as the sample. The beam diameter was 100 μm, the beam output was 25 W at 15 kV, and the beam irradiation time was 200 ms per point. Binding energy in a range from 0 eV to 1100 eV was measured. The scan step was 0.5 eV. The pass energy was 280 eV. Respective proportions (%) of the numbers of Al atoms and Ce atoms when the total number of atoms of Al, Ce and Zr was defined as 100% was calculated from a spectrum as a result of ten-time integration. The results are shown in the following Table 2.

Then, based on the following formulae, surface Al accumulation rates were calculated using the ratio $R_1$ of the number of Al atoms to the number of Ce atoms measured by fluorescence X-ray (XRF) analysis, and the ratio $R_2$ of the number of Al atoms to the number of Ce atoms in the composite measured by X-ray photoelectron spectroscopy (XPS) method. The results are shown in Table 3.

R1=number of Al atoms/number of Ce atoms (XRF analysis)

R2=number of Al atoms/number of Ce atoms (XPS measurement)

Surface Al accumulation ratio=R2/R1     [Formula 1]

TABLE 1

Results of XRF Measurement

| Composite Oxide | | Proportion of Number of Atoms (%) | | | | |
|---|---|---|---|---|---|---|
| | | Al | Ce | Zr | La | Nd |
| Example 1 | A | 74.18 | 9.59 | 14.76 | 0.43 | 1.03 |
| Example 2 | B | 74.07 | 9.39 | 15.04 | 0.44 | 1.06 |
| Comparative Example 1 | C | 72.90 | 9.40 | 15.73 | 0.89 | 1.08 |
| Comparative Example 2 | D | 72.15 | 10.30 | 15.27 | 0.95 | 1.33 |
| Comparative Example 3 | E | 72.89 | 10.39 | 14.83 | 0.66 | 1.23 |
| Comparative Example 4 | F | 73.03 | 9.75 | 14.74 | 0.98 | 1.50 |
| Example 3 | G | 86.86 | 4.89 | 7.40 | 0.24 | 0.61 |
| Example 4 | H | 55.38 | 16.82 | 25.08 | 0.81 | 1.91 |

TABLE 2

Results of XPS Measurement

| Composite Oxide | | Proportion of Number of Atoms (%) | |
|---|---|---|---|
| | | Al | Ce |
| Example 1 | A | 83.2 | 4.1 |
| Example 2 | B | 86.6 | 2.1 |
| Comparative Example 1 | C | 91.7 | 2.0 |
| Comparative Example 2 | D | 80.3 | 5.1 |
| Comparative Example 3 | E | 92.3 | 5.9 |
| Comparative Example 4 | F | 96.4 | 1.7 |
| Example 3 | G | 90.8 | 1.8 |
| Example 4 | H | 67.1 | 8.5 |

TABLE 3

R1, R2, and Surface Al Accumulation Rate

|  | Composite | $R_1$ | $R_2$ | Surface Al Accumulation Rate |
|---|---|---|---|---|
| Example 1 | A | 7.73 | 20.29 | 2.62 |
| Example 2 | B | 7.89 | 41.24 | 5.23 |
| Comparative Example 1 | C | 7.75 | 45.85 | 5.92 |
| Comparative Example 2 | D | 7.00 | 15.75 | 2.25 |
| Comparative Example 3 | E | 7.01 | 15.64 | 2.23 |
| Comparative Example 4 | F | 7.49 | 56.71 | 7.57 |
| Example 3 | G | 17.75 | 50.44 | 2.84 |
| Example 4 | H | 3.29 | 7.89 | 2.40 |

Preparation of Catalyst

Rhodium nitrate, each of the Al—Ce—Zr composites A to H which were produced as mentioned above, La-containing $Al_2O_3$ (containing 4 mass % La as $La_2O_3$) were weighed such that Rh:Al—Ce—Zr composite:La-containing $Al_2O_3$ was 0.4:50:50 (mass ratio). After the composite was dispersed in pure water (mass three times of that of the composite), the rhodium nitrate was added and agitated for 30 minutes. Next, the La-containing $Al_2O_3$ was added, and wet milling was performed for 12 hours in a ball mill thereby obtaining a slurry. The pH of the slurry was 6.5. The slurry was washcoated on a monolithic cordierite carrier having 400 cells, a wall thickness of 6 mil, a diameter of 24 mm, and a length of 30 mm so that the supported amount after calcining was 100.4 g/L. This was dried at 150° C. for 30 minutes and then calcined at 550° C. for 30 minutes thereby obtaining catalysts A to H. As a result of the TEM-EDS measurement of each of the obtained catalysts, it was confirmed that Rh was supported on the Al—Ce—Zr composite in all catalysts.

Thermal Aging

A converter, on which four monolithic cordierite carriers having a diameter of 24 mm and a length of 30 mm are mountable, was used for thermally aging the catalysts produced as mentioned above. The converter was installed in a tube bifurcated from an exhaust port of a V-type, 8-cylinder, 4.6-liter engine. The converter was installed 25 cm downstream of the exhaust port. The engine was run such that the catalyst bed temperature was 1000° C. and the A/F was 14.6, and subsequently a cycle of an A/F of 13.8 and fuel cutoff was repeated. Based on this cycle, the catalysts were thermally aged for a total of 50 hours. In this way, thermal aging of catalysts A to H (eight pieces) was performed simultaneously.

Evaluation for Hydrogen Generation Properties: Water Gas Shift Reaction Test Using, as the hydrogen-producing catalyst, the thermally aged catalyst, hydrogen generation properties evaluation (water gas shift reaction test) was performed using simulated gas. The test conditions are shown in the following Table 4. The temperature of the catalyst inlet was held at 500° C., and the Lean and Rich gasses were supplied alternatingly for five seconds each for 17 times at first a condition 1 (blank) and then a condition 2 (water gas shift reaction), thereby obtaining average hydrogen generation rates over 15 rich cycles after the first 15 seconds. Next, the average of condition 1 (blank) was subtracted from the average of condition 2 (water gas shift reaction), and the hydrogen generation rate (%) in the water gas shift was obtained. The results are shown in FIG. 1.

TABLE 4

Test Conditions

|  | Condition 1 (Blank) | | Condition 2 (Water Gas Shift Reaction) | |
|---|---|---|---|---|
|  | Lean | Rich | Lean | Rich |
| CO [vol. %] | 0.45 | 0.7 | 0.45 | 0.7 |
| $O_2$ [vol. %] | 0.6 | 0 | 0.6 | 0 |
| $H_2O$ [vol. %] | 0 | 0 | 8 | 8 |
| $N_2$ | Balance | Balance | Balance | Balance |
| Space velocity [$h^{-1}$] | 150000 | 150000 | 150000 | 150000 |
| Retention Time [sec] | 5 | 5 | 5 | 5 |

From the graph of FIG. 1, it can be seen that the catalysts of the examples have excellent hydrogen generation properties.

Evaluation for Exhaust Gas Purification Performance

Using, as the exhaust gas purifying catalyst, the thermally aged catalysts, the exhaust gas purification performance evaluation was performed using simulated gas. The simulated gas (A/F: 14.6) with a CO: 5500 ppm, NO: 1370 ppm, $C_3H_6$: 1460 ppm (in terms of methane), $O_2$: 3200 ppm, $CO_2$: 14.5%, and $H_2O$: 10.0% and $N_2$ balance flowed at a rate of 22.62 L/minute while the temperature of the catalyst inlet 1.0 cm away from a catalyst inlet end surface was increased from 100° C. to 400° C. at a rate of 20° C. per minute. The gas discharged from the catalyst outlet was analyzed to calculate respective purification rates of CO, HC and NOx, and a temperature, at which each purification rate reached 50%, was defined as T50. The results are shown in FIGS. 2A to 2C.

Figure 2A:
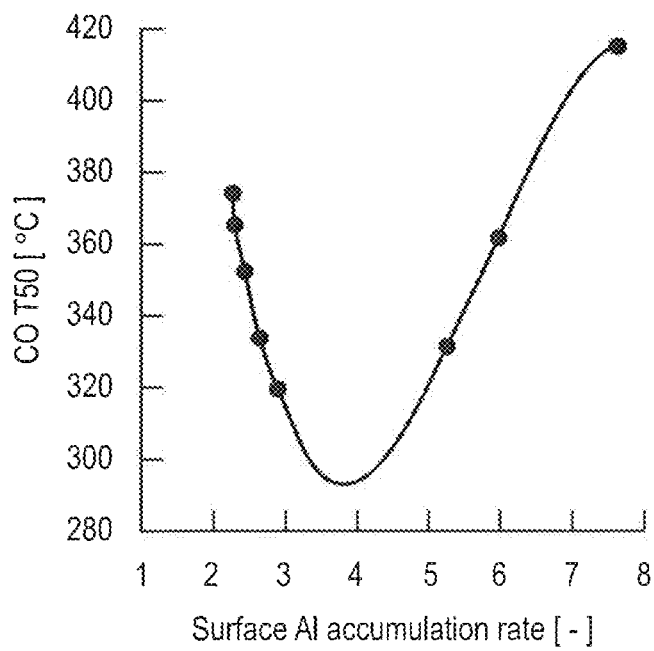
FIG. 2A is a graph expressing and illustrating the relationship between the surface Al accumulation rates ($R_2/R_1$) and temperatures indicative of respective 50% purification rates (T50) of CO in the catalysts A to H.
Figure 2B:
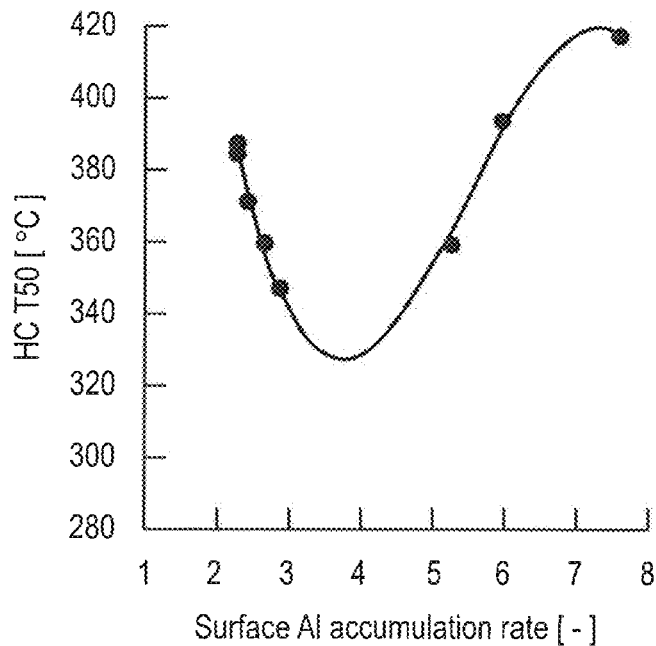
FIG. 2B is a graph expressing and illustrating the relationship between the surface Al accumulation rates ($R_2/R_1$) and temperatures indicative of 50% purification rates (T50) of HC in the catalysts A to H.
Figure 2C:
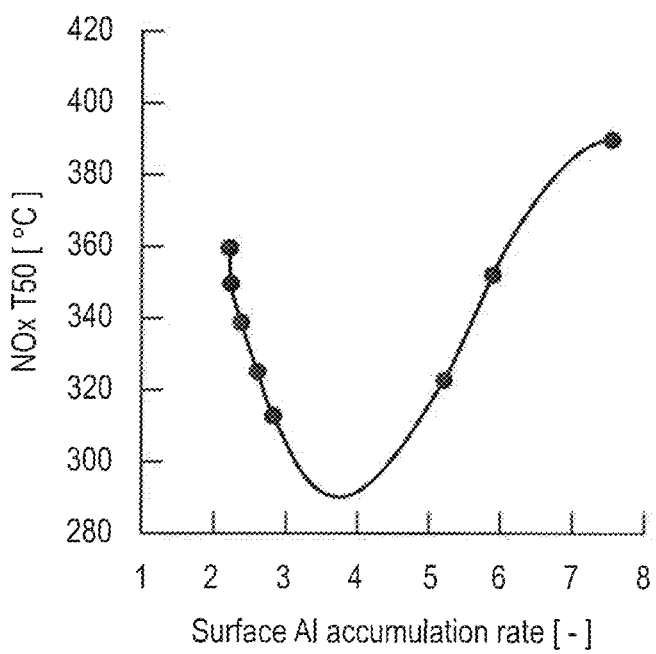
FIG. 2C is a graph expressing and illustrating the relationship between the surface Al accumulation rates ($R_2/R_1$) and temperatures indicative of 50% purification rates (T50) of NOx in the catalysts A to H.

The graphs of FIGS. 2A to 2C show that the catalysts of the examples exhibited excellent purification of CO, HC, and NOx.

Preparing Exhaust Gas Purifying Catalyst

Palladium nitrate, barium sulfate, ceria-zirconia-lanthana ($CeO_2$:$ZrO_2$:$La_2O_3$=45:45:10 (mass ratio)) and La-containing $Al_2O_3$ (contains 4 mass % La as $La_2O_3$) were weighed such that Pd:bariumsulfate:ceria-zirconia-lanthana:La-containing $Al_2O_3$ was 3:10:26:26 (mass ratio). After the barium sulfate, the ceria-zirconia-lanthana, and the La-containing $Al_2O_3$ were dispersed in pure water (four times in mass relative to the ceria-zirconia-lanthana), the palladium nitrate was added, and wet milling was performed for 20 minutes in a ball mill thereby obtaining a bottom layer slurry.

Next, an upper layer slurry containing each of the Al—Ce—Zr composites A, F, and G produced as mentioned above was prepared. Rhodium nitrate, a Al—Ce—Zr-composite, La-containing $Al_2O_3$ (containing La by 4 mass % as $La_2O_3$) were weighed such that Rh:composite:La-containing $Al_2O_3$ was 0.3:55.5:31.5. After the composite was dispersed in pure water (two times in mass relative to the composite), rhodium nitrate was added and agitated for 30 minutes. Next, the La-containing $Al_2O_3$ was added and wet milling was performed for 20 minutes in a ball mill thereby obtaining an upper layer slurry containing each of the composites A, F, and G.

The bottom layer slurry was washcoated on a monolithic cordierite carrier having 600 cells per square inch, a wall thickness of 2.0 mil, a diameter of 118.4 mm, and a length of 91 mm so that the supported amount after calcination was 65 g/L. This was dried at 150° C. for 30 minutes and then calcined at 550° C. for 30 minutes thereby obtaining a lower catalyst layer.

The upper layer slurry containing each of the composites A, F, and G was washcoated on the surface of the lower catalyst layer formed as mentioned above, so that the supported amount after calcination was 87.3 g/L. This was dried at 150° C. for 30 minutes and then calcined at 550° C. for 30 minutes thereby obtaining the respective exhaust gas purifying catalysts A, F, and G. As a result of the TEM-EDS measurement of each of the obtained catalysts, it was confirmed that Rh was supported on the Al—Ce—Zr composite in all catalysts.

Thermal Aging Treatment

Each of the exhaust gas purifying catalysts produced as abovementioned was installed 25 cm downstream of the exhaust port of a V-type, 8-cylinder, 4.6-liter engine. The engine was run so that the temperature of the catalyst bed was 960° C., and a cycle of an A/F at the catalyst inlet of 14.6, 13.0, and fuel cutoff was repeated. Based on this cycle, the thermal aging was performed on each of the exhaust gas purifying catalysts for a total of 50 hours.

Evaluation of Exhaust Gas Purification Performance

The exhaust gas purifying catalysts A, F, and G after thermal aging were each installed 30 cm downstream of an exhaust port of a straight-six, 2.4-liter engine. The engine was run such that the A/F at the catalyst inlet was 14.6, and exhaust gas was flowed through the catalyst while the catalyst inlet temperature was raised from 100° C. to 500° C. at a rate of 50° C. per minute. The gas discharged from the catalyst outlet was analyzed to calculate respective purification rates of CO, HC and NOx, and the temperature at which each purification rate reached 50% was defined as T50. The results are shown in FIG. 3.

Figure 3:
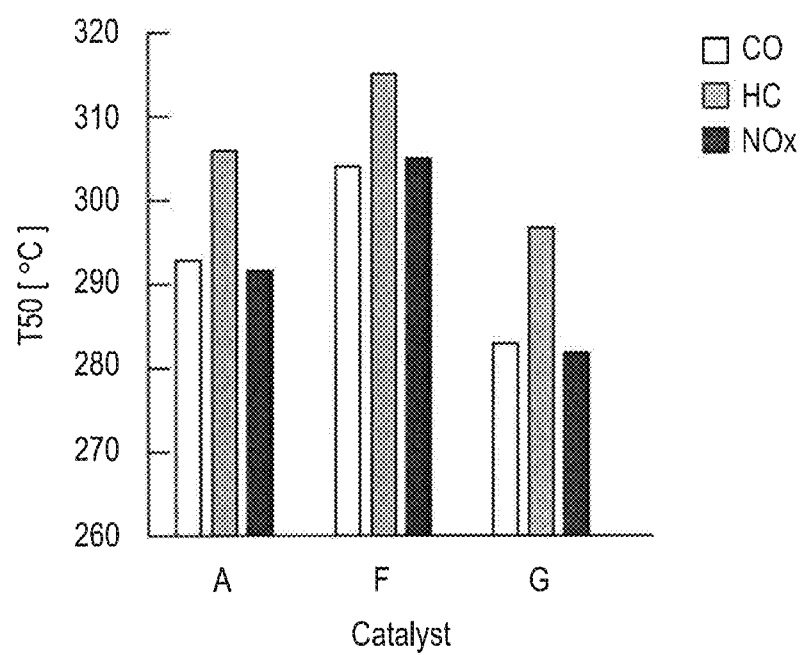
FIG. 3 is a graph expressing and illustrating the relationship between the surface Al accumulation rates ($R_2/R_1$) and temperatures indicative of respective 50% purification rates of CO, HC, and NOx in the exhaust gas purifying catalysts A, F, and G.

The graph of FIG. 3 shows that the catalysts of the examples exhibit excellent purification of CO, HC, and NOx.

The present application is based on Japanese Patent Application No. 2017-254105, filed on Dec. 28, 2017, and the disclosure of which is incorporated by reference in its entirety.

What is claimed is:

1. A hydrogen-producing catalyst comprising:
a composite containing Al, Ce, and Zr; and
Rh, wherein
when a ratio of the number of Al atoms to the number of Ce atoms (Al/Ce) in the composite measured by X-ray fluorescence (XRF) analysis is $R_1$ and a ratio of the number of Al atoms to the number of Ce atoms (Al/Ce) in the composite measured by an X-ray photoelectron spectroscopy (XPS) method is $R_2$, a value of $R_2/R_1$ is greater than 2.25 and less than 5.92.

2. The hydrogen-producing catalyst according to claim 1, wherein the value of $R_2/R_1$ is 2.40 to 5.23.

3. The hydrogen-producing catalyst according to claim 2, wherein a ratio of the number of Al atoms in the composite to the number of atoms of metal elements contained in the composite is 50% to 92%.

4. The hydrogen-producing catalyst according to claim 2, wherein a ratio of the number of Ce atoms in the composite to the number of atoms of metal elements contained in the composite is 3% to 20%.

5. The hydrogen-producing catalyst according to claim 2, wherein a ratio of the number of Zr atoms in the composite to the number of atoms of metal elements contained in the composite is from 5% to 30%.

6. A method for producing hydrogen comprising bringing the hydrogen-producing catalyst set forth in claim 2 in contact with CO and $H_2O$.

7. The hydrogen-producing catalyst according to claim 1, wherein a ratio of the number of Al atoms in the composite to the number of atoms of metal elements contained in the composite is 50% to 92%.

8. The hydrogen-producing catalyst according to claim 1, wherein a ratio of the number of Ce atoms in the composite to the number of atoms of metal elements contained in the composite is 3% to 20%.

9. The hydrogen-producing catalyst according to claim 1, wherein a ratio of the number of Zr atoms in the composite to the number of atoms of metal elements contained in the composite is from 5% to 30%.

10. The hydrogen-producing catalyst according to claim 1, wherein the composite further contains Nd.

11. The hydrogen-producing catalyst according to claim 10, wherein a ratio of the number of Nd atoms in the composite to the number of atoms of metal elements contained in the composite is from 0.5% to 2.0%.

12. The hydrogen-producing catalyst according to claim 1, wherein the composite further contains La.

13. The hydrogen-producing catalyst according to claim 12, wherein a ratio of the number of La atoms in the composite to the number of atoms of metal elements contained in the composite is from 0.20% to 1.0%.

14. An exhaust gas purifying catalyst, comprising a catalyst layer that contains the hydrogen-producing catalyst set forth in claim 1 and another catalyst layer on a carrier.

15. A method for purifying exhaust gas by using the exhaust gas purifying catalyst set forth in claim 14, the method comprising:
bringing the catalyst layer containing the hydrogen-producing catalyst in contact with CO and $H_2O$ to generate hydrogen; and
bringing the catalyst layer containing the hydrogen-producing catalyst and/or the another catalyst layer in contact with the hydrogen and NOx.

16. An exhaust gas purifying catalyst, comprising a lower catalyst layer containing Pd and an upper catalyst layer containing the hydrogen-producing catalyst of claim 1, which are subsequently deposited on a carrier.

17. The exhaust gas purifying catalyst according to claim 16, wherein at least one of the lower catalyst layer and the upper catalyst layer contains a composite oxide containing $CeO_2$ and $ZrO_2$.

18. An exhaust gas purifying catalyst, comprising a lower catalyst layer containing the hydrogen-producing catalyst of claim 1 and an upper catalyst layer containing Pd, which are subsequently deposited on a carrier.

19. The exhaust gas purifying catalyst according to claim 18, wherein at least one of the lower catalyst layer and the upper catalyst layer contains a composite oxide containing $CeO_2$ and $ZrO_2$.

20. A method for producing hydrogen comprising bringing the hydrogen-producing catalyst set forth in claim 1 in contact with CO and $H_2O$.

* * * * *